US009878574B2

(12) United States Patent
Merchant

(10) Patent No.: US 9,878,574 B2
(45) Date of Patent: Jan. 30, 2018

(54) SECURITY FOIL AND METHOD

(71) Applicant: Timothy P. Merchant, Fancy Gap, VA (US)

(72) Inventor: Timothy P. Merchant, Fancy Gap, VA (US)

(73) Assignee: YPB Group, Ltd., Bangkok (TH)

( * ) Notice: Subject to any disclaimer, the term of this patent is extended or adjusted under 35 U.S.C. 154(b) by 0 days.

(21) Appl. No.: 14/823,147

(22) Filed: Aug. 11, 2015

(65) Prior Publication Data

US 2017/0046607 A1 Feb. 16, 2017

(51) Int. Cl.

| | |
|---|---|
| ***G06K 19/06*** | (2006.01) |
| ***B42D 25/382*** | (2014.01) |
| ***B42D 25/29*** | (2014.01) |
| ***B42D 25/45*** | (2014.01) |
| ***G07D 7/1205*** | (2016.01) |

(52) U.S. Cl.

CPC ........... *B42D 25/382* (2014.10); *B42D 25/29* (2014.10); *B42D 25/45* (2014.10); *G07D 7/1205* (2017.05)

(58) Field of Classification Search

CPC ...... B42D 25/29; B42D 25/30; B42D 25/305; G06K 19/00

USPC ........................................ 235/491, 375, 380

See application file for complete search history.

(56) References Cited

U.S. PATENT DOCUMENTS

| | | | | |
|---|---|---|---|---|
| 5,057,368 | A | 10/1991 | Largman et al. | |
| 5,069,970 | A | 12/1991 | Largman et al. | |
| 5,108,820 | A | 4/1992 | Kaneko et al. | |
| 5,277,976 | A | 1/1994 | Hogle et al. | |
| 5,336,552 | A | 8/1994 | Strack et al. | |
| 5,382,400 | A | 1/1995 | Pike et al. | |
| 6,832,783 | B2 | 12/2004 | Lawandy | |
| 7,256,398 | B2 | 8/2007 | Ross et al. | |
| 7,744,964 | B2 | 6/2010 | Phillips et al. | |
| 8,137,811 | B2 | 3/2012 | Merchant et al. | |
| 2005/0178841 | A1 | 8/2005 | Jones, II et al. | |
| 2006/0181077 | A1 * | 8/2006 | Kaule | B41M 3/148 283/72 |
| 2007/0194934 | A1 * | 8/2007 | Tauber | B42D 25/43 340/572.8 |
| 2007/0195392 | A1 | 8/2007 | Phillips et al. | |
| 2014/0312606 | A1 * | 10/2014 | Lister | B41M 3/148 283/85 |
| 2016/0075165 | A1 * | 3/2016 | MacHizaud | B42D 25/369 428/138 |

FOREIGN PATENT DOCUMENTS

| | | |
|---|---|---|
| EP | 1832439 | 4/2014 |

* cited by examiner

*Primary Examiner* — Daniel St Cyr

(74) *Attorney, Agent, or Firm* — Tuggle Duggins P.A.; Blake Hurt

(57) ABSTRACT

A non-embossed security foil formed by a first taggant and a second taggant each positioned on a metallic surface and optically reactive to different stimuli for confirming the authenticity of important documents is provided. Each taggant defines a different color when exposed to an associated optical stimulus such as an infrared (IR) laser pen, allowing for the creation of multiple color, in register indicia or images that are covertly embedded into official documents and which are otherwise invisible to the naked eye. A method of utilizing taggants that are optically reactive to stimuli of different wavelengths is also provided.

17 Claims, 3 Drawing Sheets

SECURITY FOIL AND METHOD

FIELD OF THE INVENTION

The invention herein pertains to security foils used in the authorization of documents and particularly pertains to a non-embossed security foil with multiple colors, in register images viewable in the visible light spectrum in the presence of infrared (IR) illuminating conditions.

DESCRIPTION OF THE PRIOR ART AND OBJECTIVES OF THE INVENTION

The use of stamps, crests, and other seals to certify official documents has been known for centuries. Far from the days of pressing wax with a signet ring to indicate authenticity, the need for secure documents, identifications, licenses, cards, certificates, and the like has never been greater as the reach of international travel and commerce has expanded to a global scale. It is well known to incorporate optically active members, features, into various documents which luminesce, fluoresce or emit various energy wave lengths that can be easily identified. These emissions may be in the visible or invisible light range. It is also known to produce fibers and yarns containing two of more types of colorants, such as pigments and dyes, or UV-brighteners, but these active materials exhibit visible responses in the excitation frequencies of each other, e.g., pigments reflect color (though muted) in UV light, etc. It is also known to produce taggant fibers with optically active additives that visibly respond to a single stimulating illumination source. Certain security markers or taggants are described in U.S. Pat. No. 7,256,398 and U.S. Patent Publication No. 2005/0178841. U.S. Pat. No. 6,832,783 describes optically based methods and an apparatus for performing sorting, coding and authentication for use on objects including currency, negotiable instruments, passports, wills and other documents. U.S. Pat. No. 5,108,820, U.S. Pat. No. 5,336,552, and U.S. Pat. No. 5,382,400 show multicomponent fiber constructions. The multicomponent fibers may also have unconventional shapes (such as multi-lobed) as described in U.S. Pat. Nos. 5,277,976, 5,057,368 and 5,069,970.

It is also well known to produce fibers and fabrics made from different polymers as set forth in U.S. Pat. No. 5,108,820 while U.S. Pat. No. 5,069,970 demonstrates the use of various fiber shapes. It is also conventional in the taggant art to use inorganic materials such as yttrium oxide and calcium fluoride. Organic compounds which are used as taggants include materials derived from naturally occurring fluorescent minerals and certain organic dyes which will react under a UV light source to generate an identifiable wave length.

In addition to the addition of taggants as described embossing or debossing official seals is often an additional or secondary method of altering the surface of a certification or document, particularly in an age when digital printers and the like can recreate almost any color palate or luminescent quality. The hot-stamping of foils is another known method of authenticating important documents, as the creation of a hologram is optically more challenging than a sticker or seal. However, it is often difficult if not impossible for security personnel and members of financial institutions to identify and recall the inclusion and specific placement of such authentication methods, leading to numerous attempts at counterfeiting and fraud.

Thus, in view of the problems and disadvantages associated with prior art devices and authentication methods, the present invention was conceived and one of its objectives is to provide a security foil and method of manufacture and use to confirm the security and authenticity of a document.

It is another objective of the present invention to provide a non-embossed, optically active security foil.

It is yet another objective of the present invention to provide a security foil with a carrier layer, a wax layer a colored lacquer layer, a first image defined by a first taggant, a second image defined by a second taggant, a metallic foil layer, and an adhesive layer with a removable backing.

It is still another objective of the present invention to provide a security foil with a first image defined by a first taggant and a second image defined by a second taggant, the first image different from the second image OT the same image but in a different position.

It is a further objective of the present invention to provide a security foil with a first image defined by a first upconverting taggant and a second image defined by a second upconverting taggant (anti-stokes movement) and/or down converting taggant (stokes movement), the first taggant different from the second taggant.

It is still a further objective of the present invention to provide a security foil with a first image defined by a first color taggant visible in a first wavelength range and a second image defined by a second color taggant visible in a second wavelength range, the first wavelength range different from the second wavelength range.

It is yet a further objective of the present invention to provide a security foil with color images in register preferably producible in a single manufacturing run, but also producible in multiple runs with a re-entry registration device on the production line.

It is another objective of the present invention to provide a security foil with a covert image in size 2, 3, 4 including up to 10 point type that is visually resolved in the presence of IR stimulus. The reference to point size is for approximation of size as the image does not have to be text, and may be a logo, artwork, or any type graphic image.

It is a further objective of the present invention to provide a method of confirming the authenticity or a document by utilizing a non-embossed security foil as described above to determine the presence or absence of two (2) separate covert images visible within varying wavelengths of light such as IR or UV light.

Various other objectives and advantages of the present invention will become apparent to those skilled in the art as a more detailed description is set forth below.

SUMMARY OF THE INVENTION

The aforesaid and other objectives are realized by providing a non-embossed security foil formed by a carrier layer of polyethylene terephthalate (PET), a wax layer formed from a natural or synthetic wax, a color layer defined by a lacquer stain, coat or finish, a metallic foil layer, an adhesive layer that can be activated by heat or cold transfer via a transfer adhesive with a removable backing or a printed adhesive and subsequently overlay the foil onto the adhesive. A first covert, color image is defined on the surface of the metallic foil by a first upconverting taggant which is excitable when exposed to an infrared light source and becomes visible within a first wavelength range, for example at approximately 500 nm which is visible as "green". A second covert, color image is defined on the surface of the metallic foil in register with the first covert, color image. The second, third and any subsequent taggant can be a down converting (stokes movement) or up converting (anti-stokes movement) variety and placed in register with the other images viewable in the visible spectrum when simultaneously illuminated with UV and IR light. For example, the subsequent taggant can be excited by IR 980 nm and give off a visual response at approximately 470 nm which is visible as "blue". By producing multiple, consistently aligned images on a non-embossed security foil, legitimate documents bearing the foil are much more difficult to counterfeit than previously known in the art. A method of producing the security foil described above and its use in the authentication of important documents is also disclosed.

DETAILED DESCRIPTION OF THE PREFERRED EMBODIMENT AND OPERATION OF THE INVENTION

Figure 1:
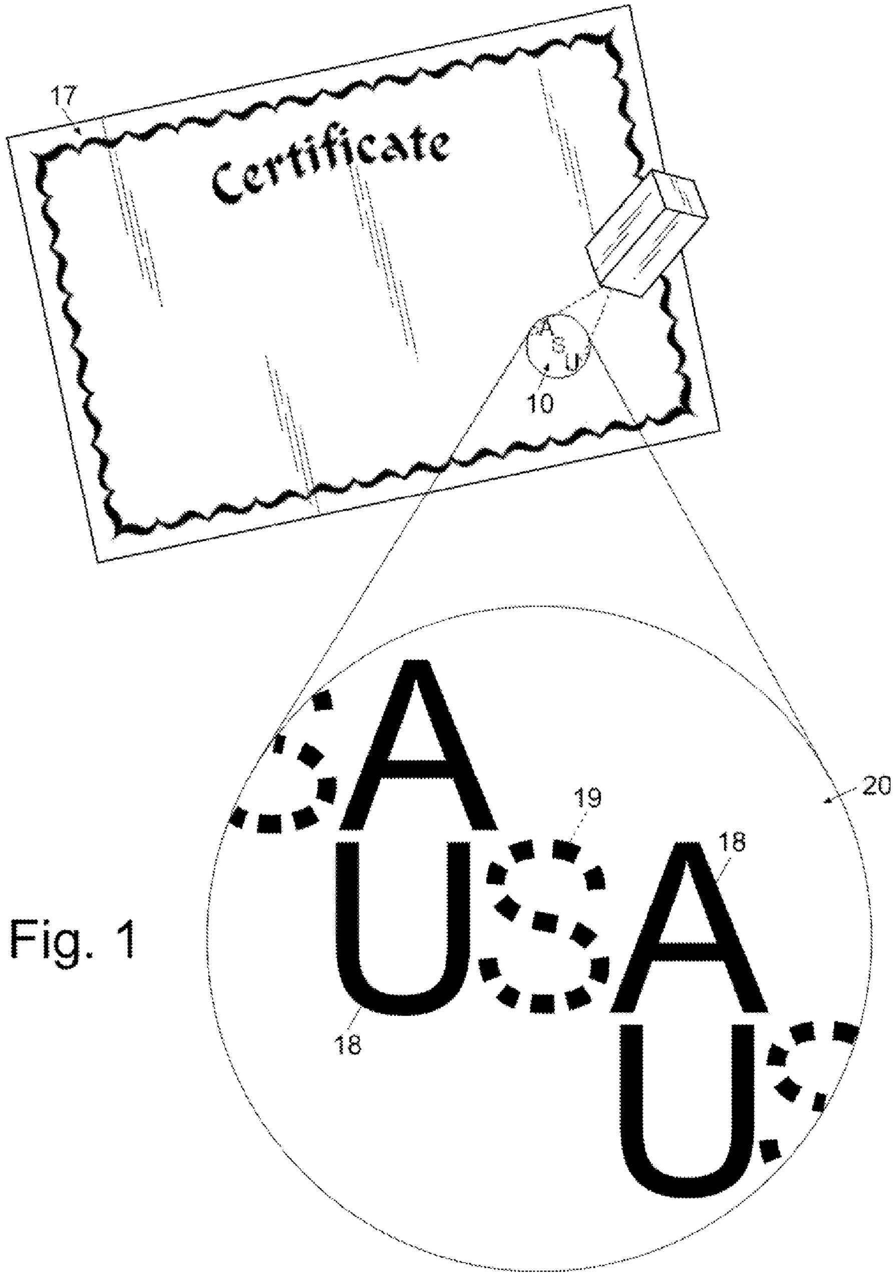
FIG. 1 shows a side perspective view of a schematic document bearing a security foil under a first wavelength of light.
Figure 2:
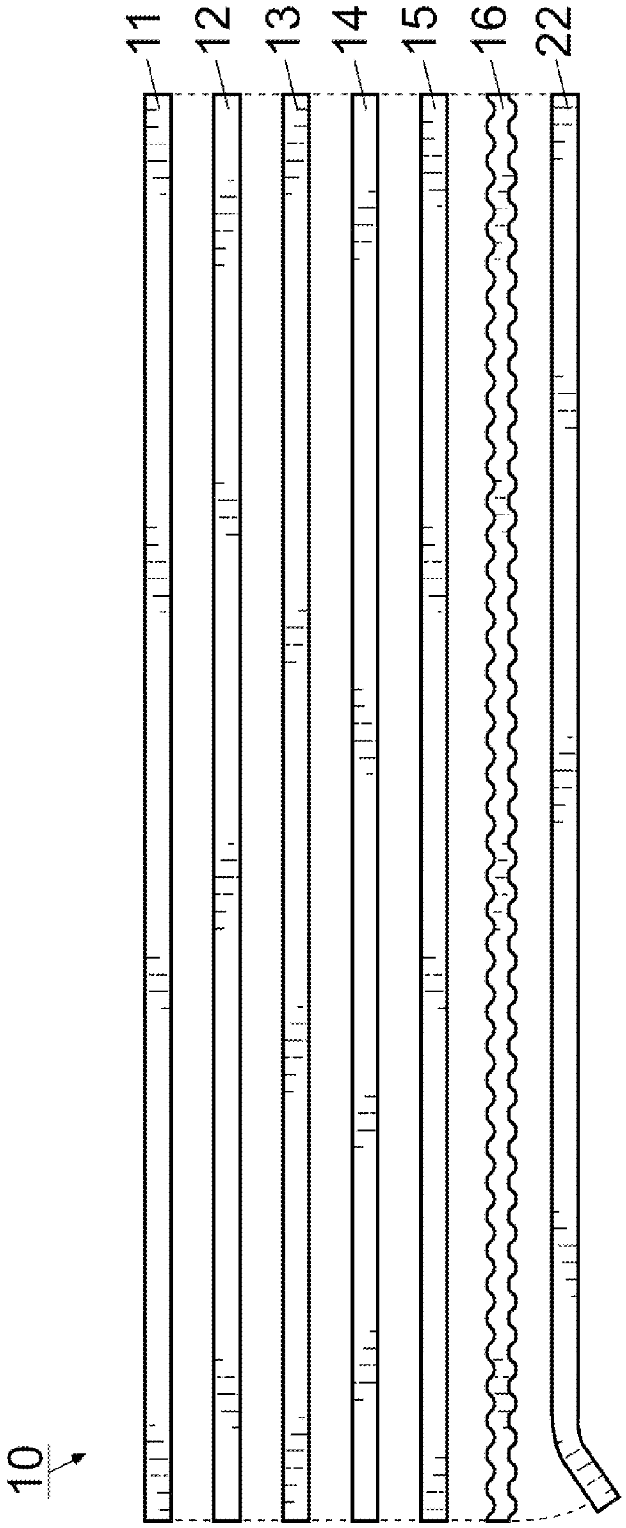
FIG. 2 pictures an elevated end view of the security foil of FIG. 1 in exploded fashion.
Figure 3:
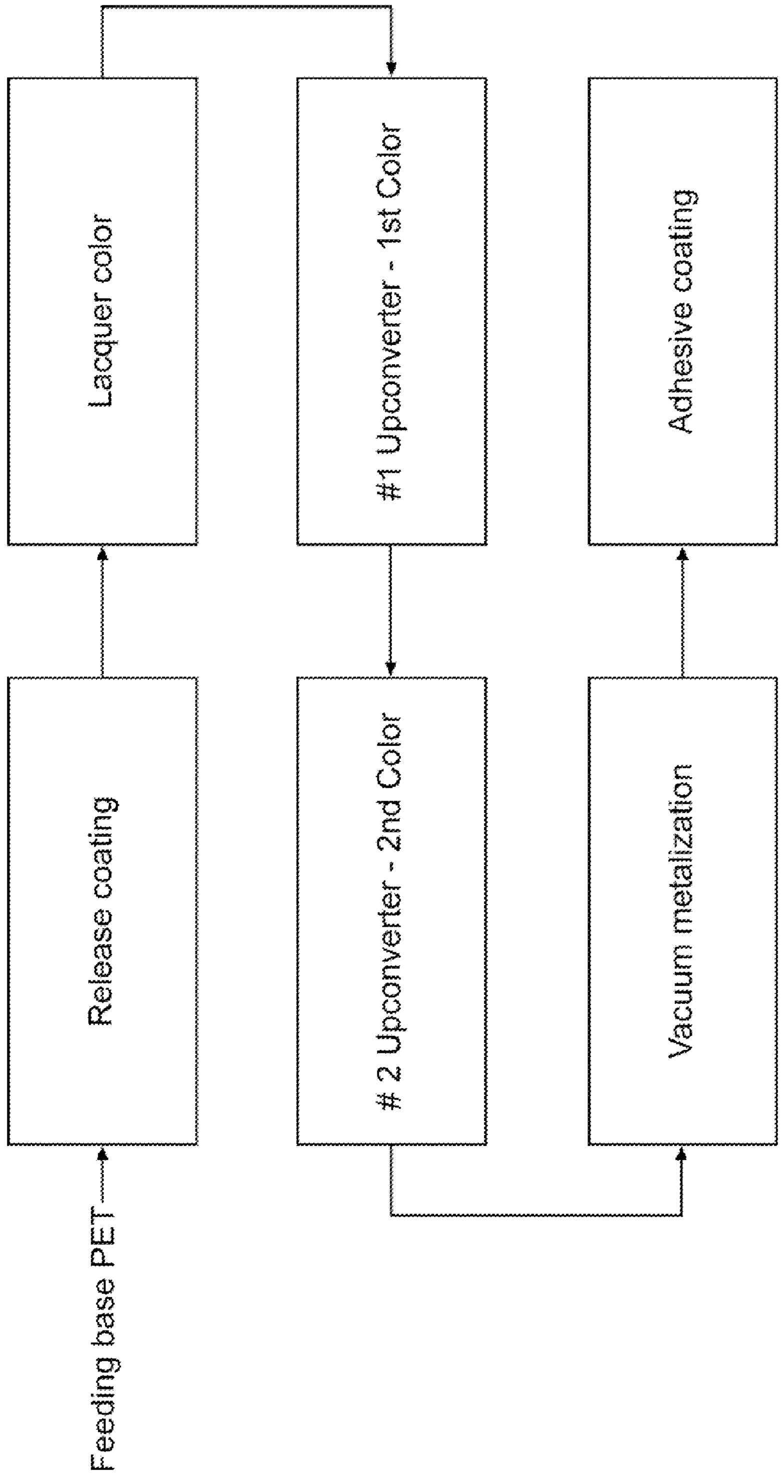
FIG. 3 depicts a method of manufacture of the security foil of FIG. 1.

For a better understanding of the invention and its operation, turning now to the drawings, FIGS. 1-2 display preferred non-embossed security foil 10 formed from carrier layer 11, wax layer 12, lacquer layer 13, taggant layer 14, metallic layer 15, and adhesive layer 16. Carrier layer 11 is preferably comprised of polyethylene terephthalate (PET), although other substantially clear polymer resin substrates such as polyolefins, including polypropylene, polyethylene, polybutene, polymethyl pentene (PMP) polyamides, including nylon 6, nylon 6,6, polyesters, including polyethylene terephthalate (PET), polyethylene naphthalate, polytrimethylene terephthalate, poly (1,4-cyclohexylene dimethylene terephthalate) (PCT), and aliphatic polyesters such as polylactic acid (PLA), polyphenylene sulfide, thermoplastic elastomers, polyacrylonitrile, acetals, fluoropolymers, co- and ter-polymers thereof and mixtures thereof, may also suffice. Metallic layer 15 is preferably formed from a thin-gauge aluminum although other metallic materials such as silver, copper, tin nickel, and the like are also acceptable. FIG. 1 demonstrates security foil 10 placed on representative document 17 which represents official documents bearing a seal such as birth certificates, death certificates, professional licenses, passports, titles, deeds, financial instruments, and the like. As shown in FIG. 2, an embodiment of security foil 10 may also include a removable backing 22 to cover and protect adhesive layer 16 until bonding engagement with document 17 is desired.

The use of one or more optically active taggants to aid in the authentication of important documents is known in the art. See for example U.S. Pat. No. 8,137,811, co-owned by the instant assignee and incorporated in its entirety herein. As utilized herein, the term "taggant" refers to an energy converting material and may include any organic or inorganic member incorporated into inks, fabrics, yarns, dyes, powders, filaments, pigments, Anti-Stokes ink and/or Stokes inks and any other optically active substance that excites and visibly emits in the presence of energy radiation between 200 nm and 1200 nm. These materials range from submicron particle size up to approximately 8 microns and often come in the form of yttrium oxide, phytochrome, riboflavin, isotopic tags, or the like made into a luminescent powder. The preferred embodiment of security foil 10 includes taggant layer 14 including at least first taggant 18 and second taggant 19, both defined as an IR-laser responsive (upconverting or "anti-stokes movement") taggant, suspended within a vehicle such as a clear lacquer or the like. Alternative embodiments of security foil 10 may include second taggant 19 defined as a UV-responsive (down converting) taggant, or additional taggants (not shown) defined as either an IR-laser responsive (upconverting) taggant or a UV-responsive (down converting or "stokes movement") taggant.

Taggants 18 and 19 function by absorbing incident light in one portion of the spectrum (200 nm to 1200 nm) and output PEAK energy in another portion of the same spectrum within the same range (200 nm to 1200 nm). When this material has IR energy (950 nm to 1100 nm) incident (excitation) upon it, the material will absorb the IR energy and convert (emit) the energy in the visible spectrum range (400 nm to 700 nm—anti-stokes movement) where the unaided human eye can see the effect. Some forms of inorganic taggant material will emit green, red or blue light. Other forms may emit light into the near infrared region Where the unaided human eye cannot see the emission (750 nm and longer). Both phenomena are referred to as upconverting, because the energy required to move on the spectral scale from longer wave lengths to lower wave lengths requires more energy than moving from lower wave lengths to longer wave lengths (down converting).

Preferred first taggant 18 and second taggant 19 are in a sufficiently manipulatable state or phase to define an image or pattern on the outward facing surface of security foil 10. A substantially liquid embodiment of taggant and vehicle such as a dye, ink, or liquefied powder is therefore preferred, but by no means limiting. As shown in the magnified portion of FIG. 1, an embodiment of security foil 10 may include first taggant 18 and second taggant 19 deployed in one or more covert images 20. For example, in FIG. 1 first taggant 18 is represented as defining the letters "U" and "A" while second taggant 19 is represented as defining the letter "S", filling out the covert image "USA". Were this example of image 20 viewed in ambient light, no part of image 20 would be visible. If the image were exposed to a wavelength of light corresponding with first taggant 18, the "S" would not be visible. However, if image 20 were exposed to dual wavelengths of light corresponding to first taggant 18 and second taggant 19 simultaneously, the full "USA" image would be visible. It should be noted that image 20 may be a single image, but preferably defines a repeated image, increasing the challenges of producing image 20 with varying first taggant 18 and second taggant 19 in register, that is to say in consistent, reproducible alignment. By utilizing the method explained in greater detail below, the consistent alignment of image 20, often in combination with alphanumeric and graphical images, shapes, and logos, serves as a further check on authenticity.

A further benefit of the repeated in register image 20 described above is the method and manner in which image 20 is resolved. Prior art security foils are typically authenticated by an Infrared (IR) laser in the range of 940-980 nm, outside the visible light spectrum. When the foil and integral taggant is stimulated, the IR light is upconverted and the covert dot becomes visible, but not the image contained within, such as the 'USA.' Hot-stamped foils do not activate in the presence of IR light. However, the range of a typical IR authenticating laser pen is relatively focused, precluding the use of larger, more elaborate in register images. Therefore, a more expansive authenticating device covering the range of 740-1100 nm with a significantly larger scope of excitation such as a wide-field illumination of 5 mm×5 mm light or greater may resolve the entire authenticated image, even with very small size fonts. For example, forensic testing shows that covert images 206 can be resolved with as little as three (3) point font.

A schematic method of producing preferred non-embossed security foil 10 is illustrated in FIG. 2. As would be understood by one of ordinary skill in the art, this depiction is representative of a foil cross section. The method includes the of providing a base substrate to service as carrier layer 11, preferable a polymeric material such as PET and applying a release coating 12 such as clear, pressure sensitive polyester, polypropylene, polystyrene, and polyethylene or the like to a side thereof. Wax 12 and a colored lacquer 13, such as yellow for a seal that will appear as gold foil, are layered onto the release layer to present a uniform flood coat for the seal surface. It should be understood that lacquer layer 13 may define any color in the Pantone Color Matching System, be it the CMYK process, the Goe system, the Natural Color system, or other known color systems, regardless of source, manufacturer, or country of origin. Further, lacquer layer may be "clear", in that it defines no reference color and thus forms a lacquer layer without discernible color. At subsequent printing stations, first taggant 18 and second taggant 19 are incorporated into a clear lacquer (FIGS. 2, 14 and 15) and deployed to form covert image or images 20. For example, first taggant 18 is a green IR upconverting taggant and second taggant 19 is a blue upconverting taggant such that the taggants are not visible when exposed to only a single wavelength range of excitation. First taggant 18 and second taggant 19 are each utilized to define image or images 20 in a reverse orientation, such that when the seal is placed on the document, the images are considered normal relative to a viewer. The substrate is then metallized, preferably via vacuum metallization which involves heating the coating metal to its boiling point in a vacuum chamber, then letting condensation deposit the metal on the substrate's surface. It is intended that other metallization methods known in the art are within the scope of the instant invention. Security foil 10 is coated with an adhesive and the foil is ready to be attached to an authentic document as illustrated in FIG. 1.

A method of authenticating official documents, currency, or the like is also provided and includes the steps of providing security foil 10 as described above, attaching, adhering, embedding, or otherwise affixing security foil 10 to document 17, and exciting, stimulating, or otherwise activating the first taggant 18 with an IR light source in a first wavelength range, exciting, stimulating, or otherwise activating second taggant 19 with an IR light source in a second wavelength range, or exciting, stimulating, or otherwise activating both first and second taggants 18 and 19, respectively, with, one or more IR light sources or a UV and IR source covering the respective ranges of first and second taggants 18 and 19, not only to confirm their respective presence and optical activity, but further to confirm that covert image or images 20 are in register or consistent alignment relative to other covert images or images 20, for example with a wide beam IR laser.

The illustrations and examples provided herein are for explanatory purposes and are not intended to limit the scope of the appended claims.

I claim:

1. A non-embossed security foil comprising a first taggant optically reactive to a first wavelength stimulus and a second taggant optically reactive to a second wavelength stimulus, the first wavelength stimulus defining a different wavelength range than the second wavelength stimulus, the first and second taggants defining a covert image on a non-embossed and non-holographic metallic layer defining a continuous surface, whereby stimulus of the first and second taggants produces optical confirmation of the presence of said taggants, and whereby the first and second taggants are positioned on the metallic layer and not a paper layer that relies on one or more openings in a paper surface to perceive the first and second taggants, resulting in a more novel and secure security feature due to the lower likelihood of counterfeiting.

2. The security foil of claim 1 whereby the first taggant is an upconverting taggant.

3. The security foil of claim 1 whereby the second taggant is an upconverting taggant.

4. The security foil of claim 1 further comprising a carrier layer, the metallic layer attached to the carrier layer.

5. The security foil of claim 4 whereby the carrier layer is formed from polymeric material formed from polyethylene terephthalate (PET).

6. The security foil of claim 1 further comprising a lacquer layer overlaying the metallic layer.

7. The security foil of claim 6 whereby the lacquer layer defines a yellow color.

8. The security foil of claim 1 whereby the first taggant defines a first covert image and the second taggant defines a second covert image, the second covert image placed in a different registered position than the first covert image or the first covert image different from the second covert image.

9. The security foil of claim 8 whereby the first image is in register with respect to the second image.

10. A non-embossed security foil comprised of a polyethylene terephthalate carrier layer, a wax layer, a lacquer layer defining a yellow color, a first upconverting taggant optically reactive to a first wavelength stimulus, a second upconverting taggant optically reactive to a second wavelength stimulus, the first and second taggants defining a plurality of in register covert images on a non-embossed and non-holographic metallic layer defining a continuous surface, and an adhesive, the first wavelength stimulus defining a different wavelength range than the second wavelength stimulus, whereby stimulus of the first and second taggants produces optical confirmation of the presence of said taggants across a visible and invisible spectral range, and whereby the first and second taggants are positioned on the metallic layer and not a paper layer that relies on one or more openings in a paper surface to perceive the first and second taggants, resulting in a more novel and secure security feature due to the lower likelihood of counterfeiting.

11. The security foil of claim 10 whereby the image or images formed from the first taggant define a different color than the image or images formed from the second taggant when the taggants are respectively stimulated.

12. The security foil of claim 10 whereby the first wavelength stimulus defines a wavelength in the Infrared (IR) nanometer range.

13. The security foil of claim 10 whereby the second wavelength stimulus defines a wavelength in the Infrared (IR) nanometer range.

14. A method of creating producing a certifiably authentic document comprising the steps of:

providing a non-embossed security foil comprising a first taggant optically reactive to a first wavelength stimulus and a second taggant optically reactive to a second wavelength stimulus, the first wavelength stimulus defining a different wavelength range than the second wavelength stimulus, the first and second taggants defining a covert image on a non-embossed and non-holographic metallic layer defining a continuous surface, whereby stimulus of the first and second taggants produces optical confirmation of the presence of said taggants, and whereby the first and second taggants are positioned on the metallic layer and not a paper layer that relies on one or more openings in a paper surface to perceive the first and second taggants, resulting in a more novel and secure security feature due to the lower likelihood of counterfeiting, and attaching the non-embossed security foil to a document.

15. The method of claim 14 further comprising the steps of:

defining a plurality of convert images with the first and second taggants, and aligning the plurality of covert images in register.

16. The method of claim 14 further comprising the steps of:

optically stimulating the first taggant with a first light source in the Infrared (IR) wavelength range, and optically stimulating the second taggant with a second light source in the Infrared (IR) wavelength range.

17. The method of claim 14 whereby the step of providing a non-embossed security foil further comprises the step of providing a carrier layer, a wax layer, a colored lacquer layer, and an adhesive layer each attached to the security foil.

* * * * *